(12) United States Patent
Dixon

(10) Patent No.: US 9,668,429 B2
(45) Date of Patent: Jun. 6, 2017

(54) PORTABLE MULTI-PURPOSE LOG SKIDDER

(71) Applicant: Charles C. Dixon, Galesville, MD (US)

(72) Inventor: Charles C. Dixon, Galesville, MD (US)

(*) Notice: Subject to any disclaimer, the term of this patent is extended or adjusted under 35 U.S.C. 154(b) by 194 days.

(21) Appl. No.: 14/230,641

(22) Filed: Mar. 31, 2014

(65) Prior Publication Data

US 2015/0272016 A1     Oct. 1, 2015

(51) Int. Cl.
*A01G 23/00* (2006.01)
*B60P 3/41* (2006.01)

(52) U.S. Cl.
CPC .............. *A01G 23/006* (2013.01); *B60P 3/41* (2013.01)

(58) Field of Classification Search
CPC ................................ A01G 23/006; B60P 3/41
USPC .............................. 180/19.3, 320; 280/47.34
See application file for complete search history.

(56) References Cited

U.S. PATENT DOCUMENTS

| | | | |
|---|---|---|---|
| 4,135,592 A * | 1/1979 | Wincent | A01G 23/006 180/19.3 |
| 5,540,296 A * | 7/1996 | Strothmann | A63B 55/61 180/19.3 |
| 6,231,030 B1 | 5/2001 | Smith | |
| 7,568,876 B1 | 8/2009 | Tenney | |
| 7,611,320 B2 | 11/2009 | Bell | |
| 8,444,361 B1 | 5/2013 | Hershey | |
| 2007/0104560 A1* | 5/2007 | Hall | B60P 3/41 414/494 |
| 2008/0038103 A1* | 2/2008 | Bell | B60P 3/41 414/462 |

* cited by examiner

*Primary Examiner* — Gerald McClain

(57) ABSTRACT

A multi-purpose portable log skidder that is a self propelled log skidder that does not require a vehicle to tow it.

10 Claims, 6 Drawing Sheets

PORTABLE MULTI-PURPOSE LOG SKIDDER

BACKGROUND OF THE INVENTION

Portable log skidders are not new to the art. U.S. Pat. No. 8,444,361 entitled, "Portable Log Skidder" issued to Hershey on May 21, 2013 teaches a portable log skidder that is towable with various vehicles with a battery operated winch. The winch has a steel cable that is wrapped around one end of the log to lift and transport the log. The present invention is a self propelled log skidder that does not require a vehicle to tow it. The ability of the present device to move on its own through the forest to retrieve and transport logs has a greater utility than that of the Hershey patent. Another limitation of the Hershey patent is, the steel cable of the winch wraps around the log and cinches tight. When the log is dropped to the ground to be removed, the steel cable is trapped underneath the log, and extra effort is required to move the log to free the steel cable. The present invention uses a grappling hook that releases the log automatically when the logs weight is no longer bearing upon the grapple, for an effortless release of the log from the skidder.

U.S. Pat. No. 7,568,876 entitled, "Portable Log Skidder", issued to Tenney on Aug. 4, 2009 teaches a portable log skidder that is towable, and also uses a cable to cinch around the log. Tenney also suffers from the same limitations as Hershey. Those limitations include the inability to be self propelled and the inability to remove a log when finished because the steel cable is trapped beneath the log and requires extra effort to free the from the cable.

U.S. Pat. No. 6,231,030 entitled, "Minimal Topsoil Disturbance Log Skidder" issued to Smith on May 15, 2001 teaches a two wheeled trailer that is towed by another vehicle and is equipped with a choker chain for cinching the to a cable to lift and transport the log. Again, this invention has the same limitations as the other prior art in that it must be towed by an additional vehicle and the choker chain will become trapped under the log and will require extra effort to free the choker chain from the underside of the log once it has been transported out of the forest or to a staging location.

None of the prior art patents teach a self propelled log skidder with a grapple. There are other aspects of the present invention that overcome the obvious limitations of the prior art. Those other aspects of the present invention are disclosed within the attached specification and claims.

THE INVENTION

The present invention is a portable multi-purpose log skidder. The portable multi-purpose log skidder comprises a base frame comprising an elongated bed that has an underside and a top.

Mounted on the underside of the bed is a first hydraulic motor and a second hydraulic motor. Each the hydraulic motors has a shaft mounted therein by a first end, a second end of each of the shafts has a back wheel mounted thereon.

There is a front axle, this front axle has two ends and a front, wheel mounted on each end. The front axle has mounted thereon a means for turning the axle and the front wheels. This means is mounted to the underside of the base frame. Mounted on the top of the bed is a fuel motor and a generator that driven by the fuel motor. Also present is a battery and a fuel supply tank for supplying fuel to the fuel motor. There is also a hydraulic oil reservoir, a hydraulic oil pump and a shaft from the fuel motor to drive the hydraulic pump. This hydraulic pump also drives a hydrostatic drive.

Also shown is a means for transferring hydraulic oil from and to the hydraulic oil reservoir, the hydraulic pump and the hydraulic motors.

There is also a first metal stanchion securely affixed by a first end to the top of the elongated bed. There is a winch with a winch motor surmounting a second end or the first metal stanchion. There is a second metal stanchion securely mounted by a first end on the top of the elongated bed. Also there is a support bar connecting the first metal stanchion and the second metal stanchion.

This second metal stanchion has mounted near a second end a pulley. Also there is a winch rope connected to a grappling hook for logs. The winch rope passes over the pulley and connecting to the winch. Also there is an electrical connection between the fuel motor and the generator. There is an electrical connection between the generator and the battery and between the battery and the winch motor. There is also a means for steering the portable log skidder.

Near the front end of the elongated bed is a counterweight on the base frame mounted over the front axle.

One embodiment of the portable multi-purpose log skidder is a counterweight that is comprised of individual, stackable, metal plates.

Another embodiment of the portable multi-purpose log skidder is a means for steering, that is an elongated shaft connected to the means for turning the axle and the front wheels.

Another embodiment is a portable multi-purpose log skidder wherein there is mounted on the elongated shaft a steering means, a throttle and throttle cable for the fuel motor.

Another embodiment of the portable multi-purpose log skidder there is mounted on the elongated shaft steering means a hydrostatic electrical switch for the hydrostatic drive from the hydraulic pump.

Yet another embodiment is a portable multi-purpose log skidder wherein there is mounted on the elongated shaft steering means a kill switch for the fuel motor.

In another embodiment of the portable log skidder, there is mounted on the elongated shaft steering means a kill switch for all electrical devices.

Another embodiment of the portable multi-purpose log skidder is a handle grip mounted on the elongated shaft steering means.

In yet another embodiment there is mounted on the elongated shaft steering means, a hand brake. There is another embodiment of the portable multi-purpose log skidder wherein the brake system is disc brakes. There is yet another embodiment of the portable multi-purpose log skidder wherein the brake system is a hydraulic brake system.

DETAILED DESCRIPTION OF THE DRAWINGS

Figure 1:
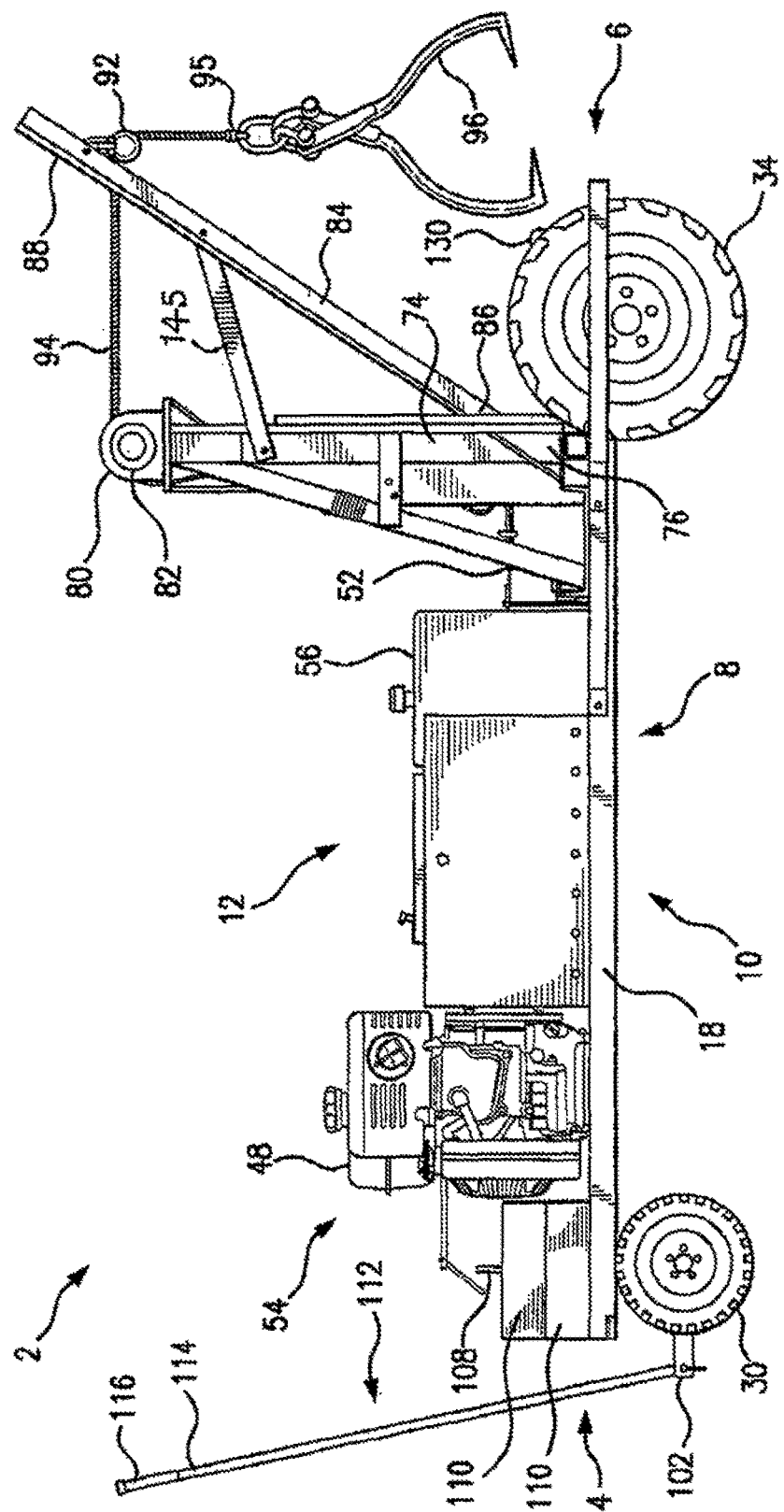
FIG. 1 shows a full side view of the multi-purpose log skidder of this invention.

FIG. 1 shows the multi-purpose log skidder 2 from the side. The front end 4, the back end 6 and the base frame 8 make up the elongated bed 18. The base frame 8 and elongated bed 18 have an underside 10 and a top side 12. Near the front end 4 is the first front wheel 30 and near the back end 6 is the first back wheel 34. On the top side 12 is the fuel motor 48. Next to the fuel motor 48 is the fuel tank 54. Also shown is the hydraulic oil reservoir or hydraulic tank 56.

Near the back end 6 on the top side 12 is the first metal stanchion 74. The first metal stanchion 74 is securely affixed by a first end 76 to the top side 12 of the elongated bed 18. Affixed to the second end 78 of the first metal stanchion 74 is the winch 80. The winch 80 has a motor 82 attached to it. There is a second metal stanchion 84 that has a first end 86 attached to the elongated bed 18 at its top side 12. The second end 88 of the second metal stanchion 84 has a pulley 92 depending from it. Extending from the winch 80 through the depending pulley 92 is the winch rope 94. In this embodiment the winch rope is wire rope. The winch rope 94 extends to a swivel connector 95 that attaches a grappling hook 96.

Near the front end 4 is the steering plate 102 that is attached to the elongated shaft 112 for steering. Part of the elongated shaft 112 comprises the handle 114 portion thereof. The end of the handle 114 has a handle grip 116.

Near the front end 4 on the top side 12 are two counterweight stabilizers 108. The metal counterweights 110 are placed over the stabilizers 108 to secure them to the front end 4 to stabilize the portable multi-purpose log skidder 2 when skidding large logs. These counterweights 110 can be added and removed to adjust the amount of weight placed over the front end 4.

There is also a ball hitch 130 that is attached to the elongated bed 18 at the back end 6 for attaching trailers and the like to transport them. The ball hitch 130 allows for the multi-purpose aspect of the device 2. It should also be known that one embodiment of the multi-purpose log skidder 2 has a receiving type hitch instead of the ball type hitch 130.

Figure 2:
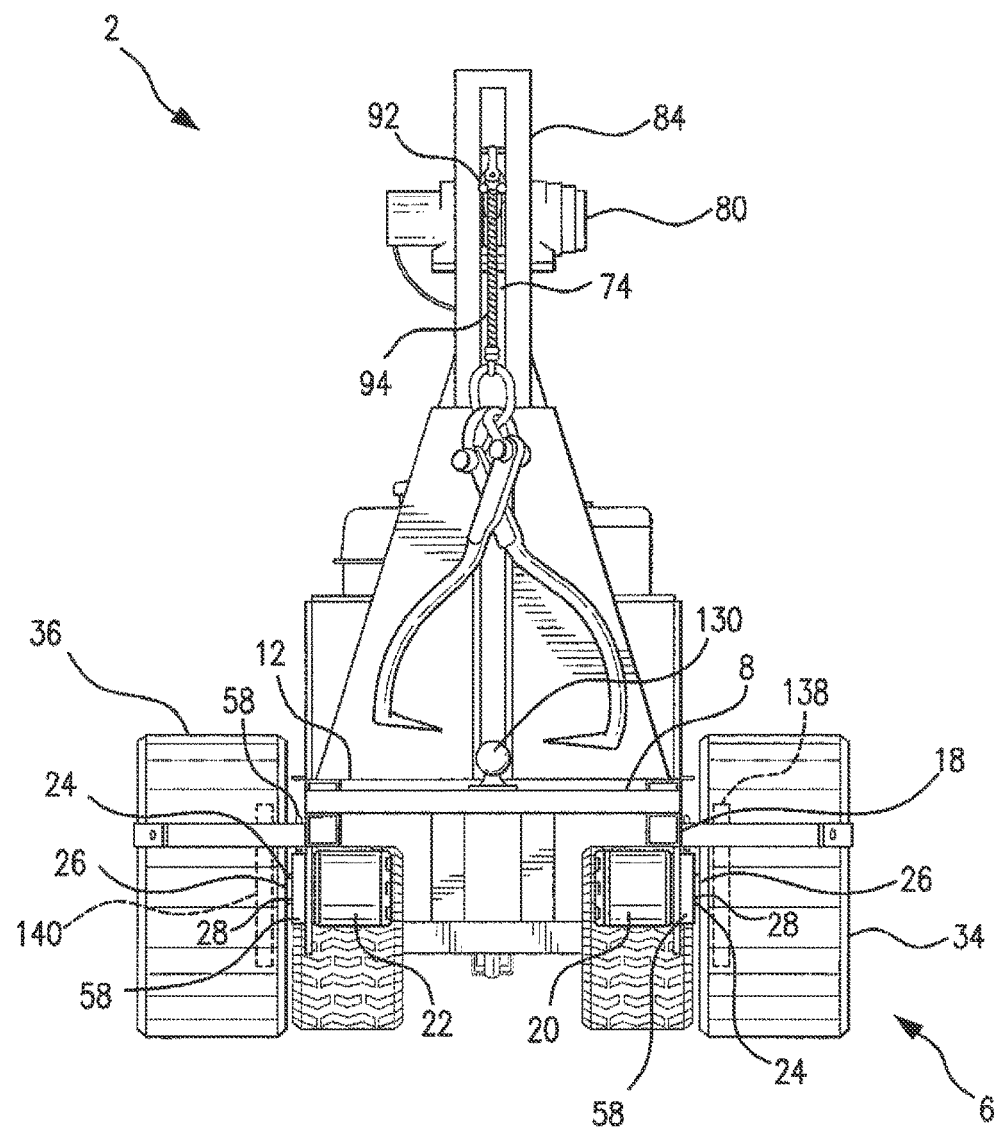
FIG. 2 shows a full back view of the multi-purpose log skidder of this invention.
Figure 4:
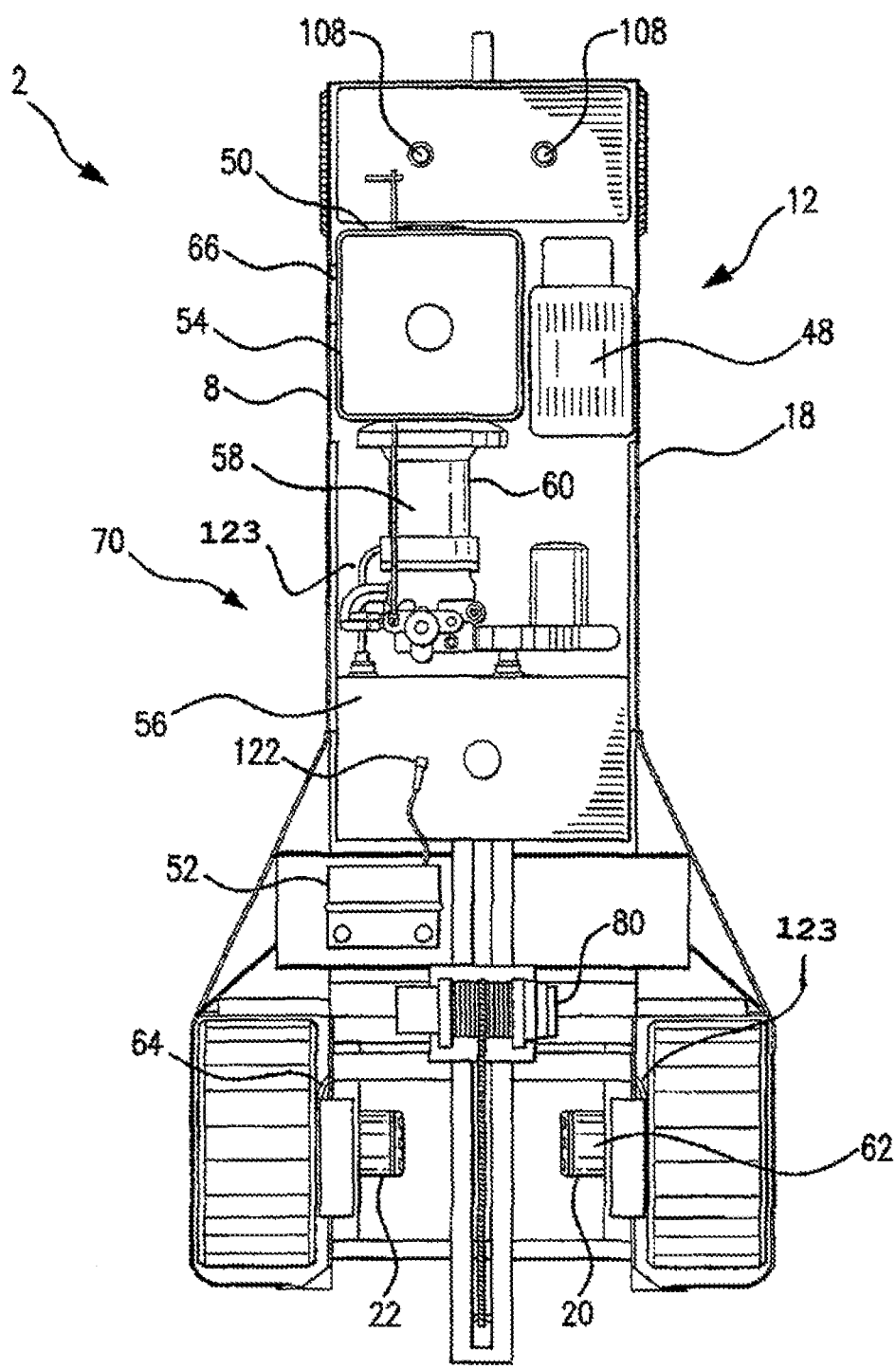
FIG. 4 shows a full top view of the multi-purpose log skidder of this invention.

FIG. 2 shows the multi-purpose log skidder 2 from the back 6. The base frame 8 and the top side 12 of the elongated bed 18 are visible. The first hydraulic motor 20 is attached by the hydraulic drive shaft to the first rear wheel 34. The first end 26 of the drive shaft 24 is attached to the first wheel 34 while the other end or second end 28 of the drive shaft 24 is attached to the hydraulic motor 20. The second hydraulic motor 22 is attached to the second wheel 36 by another drive shaft 24. Again, the first end 26 of the hydraulic drive shaft 24 is attached to the second wheel 36 and the second end 28 of the hydraulic drive shaft 24 is attached to the second hydraulic motor 22. Each hydraulic motor 20 and 22 independently drive each of the first and second wheels 34 and 36. The hydraulic motors 20 and 24 are driven by hydraulic oil that is pressurized by the hydraulic pump 58 through hydraulic lines 123 (FIG. 4). This hydraulic drive motion is controlled by a hydrostatic drive 62 (FIG. 4).

The first stanchion 74 that supports the winch 80 and the second stanchion 84 that supports the depending pulley 92 for retrieving logs with the winch rope are shown. The second stanchion 84 is securely mounted by a first end 76 on top of the elongated bed 18, there being a support bar 145 connecting the first stanchion 74 and said second stanchion 84.

Also shown is the ball hitch 130 that is attached to the back end 4 of the elongated bed 18. In another embodiment the hitch 130 is a receiver type hitch.

This embodiment shows that the hydraulic motors 20 and 22 are hydrostatically controlled. Other embodiments have electrically controlled brakes. The electric brakes 138 and 140 each control their respective first rear wheel 34 and second rear wheel 36. There is also another embodiment where the brakes 138 and 140 are standard disc brakes controlled by a hand control on handle 114, FIG. 5.

Figure 3:
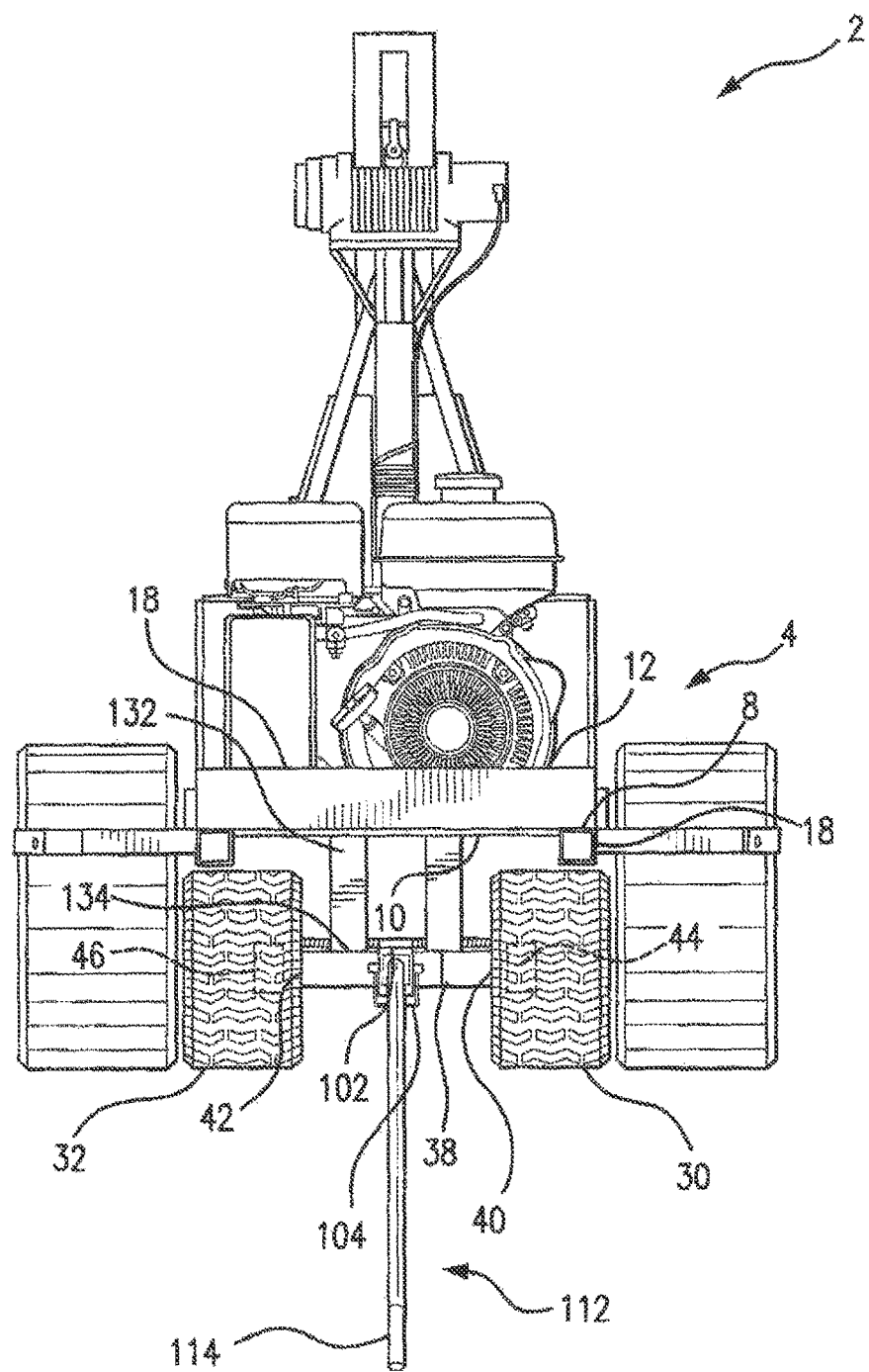
FIG. 3 shows a full front view of the multi-purpose log skidder of tis invention.

FIG. 3 shows the multi-purpose log skidder 2 from the front end 4. The base frame 8 and elongated bed 18 have an underside 10 and a top side 12. The front axle 38 has the first front wheel 30 attached at the first end 40 and the second front wheel 32 is attached at the second end 42. The first end 40 of the front axle 38 has a wheel bearing 44 to facilitate rotation of the first front wheel 30. The second end 42 of the front axle 38 has a wheel bearing 46 to facilitate rotation of the second front wheel 32. The front axle 38 is affixed to the steering plate 102. The front end 4 has a steering plate support 132 that extends downwardly from the underside 10 of the elongated bed 18. The steering plate support 132 has an opening 134 therethrough. This opening 134 therethrough accepts the steering pin 104 and is locked into place with a locking pin 106. The steering pin 104 is hollow which allows for wiring from the elongated shaft 112 and handle 114 to pass through.

FIG. 4 shows the multi-purpose log skidder 2 from the top 12. The base frame 8 of the elongated bed 18 supports the top side 12 and the fuel motor 48. The fuel motor 48 is fueled from the fuel tank 54. The fuel motor 48 runs a generator 50 and an alternator 66. The generator powers the battery 52. The alternator 66 powers the winch 80. In other embodiments the alternator 66 also powers electric brakes FIG. 2.

The hydraulic system 70 consists of the two hydraulic motors 20, 22, the hydraulic pump 58, the hydrostatic drive 62, all of the hydraulic lines 64 and the hydraulic oil tank 56. A hydraulic pump 58 is powered by the fuel motor 48 and the output shaft 60 which pressurizes the hydraulic system 70. The hydrostatic drive 62 is controlled electrically by a switch 122 (FIG. 5) in this embodiment. Other embodiments are controlled by a cable from the handle 114, FIG. 5.

This embodiment also has an electric starter 68 which is powered by the battery 52. There is an electrical lead 144 that connects the alternator 66 to the battery 52. There is an electrical lead 98 that connects the generator 50 to the winch 80.

Also shown are the counter weight stabilizers 108 and the counter weights 110.

Figure 5:
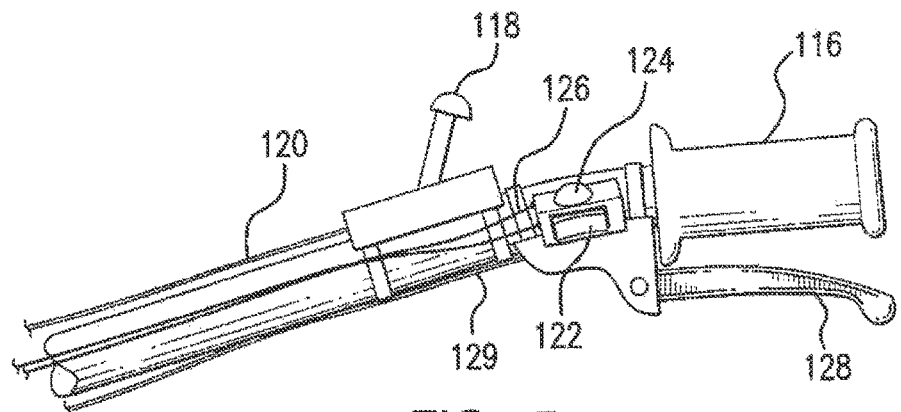
FIG. 5 shows a full side view of the handle controls of the multi-purpose log skidder.

FIG. 5 shows the handle controls of the multi-purpose log skidder 2 from the side. The elongated shaft 112 has a handle portion 114 that has a handle grip 116. This embodiment has the throttle control 118 and a throttle cable 120. Also shown is the electrically controlled hydrostatic drive switch 122. This switch 122 has a forward, neutral and a reverse position. The user simply presses the desired position with neutral being the middle position rendering the hydrostatic drive 62 inactive.

This embodiment of the multi-purpose portable log skidder 2 has a kill switch 124 on the handle 114. The kill switch 124 has an electrical lead 126 to the fuel motor 48 that will kill the motor and render it inactive. One skilled in the art will appreciate that other embodiments have the kill switch 124 directly mounted and connected to the fuel motor 48 that acts as an on/off switch.

This embodiment also includes the brake control handle 128 that has a cable 129 that when activated will operate the electronically controlled brakes 138 and 140 stopping the multi-purpose portable log skidder 2. One skilled in the art would appreciate that the same brake control apparatus is used in other embodiments as control for standard disc brakes or any other type of braking system that requires a cable 129 and a brake handle 128. The brake handle control 128 is configured to be used as a manual drive activator instead of a brake control in other embodiments.

Figure 6:
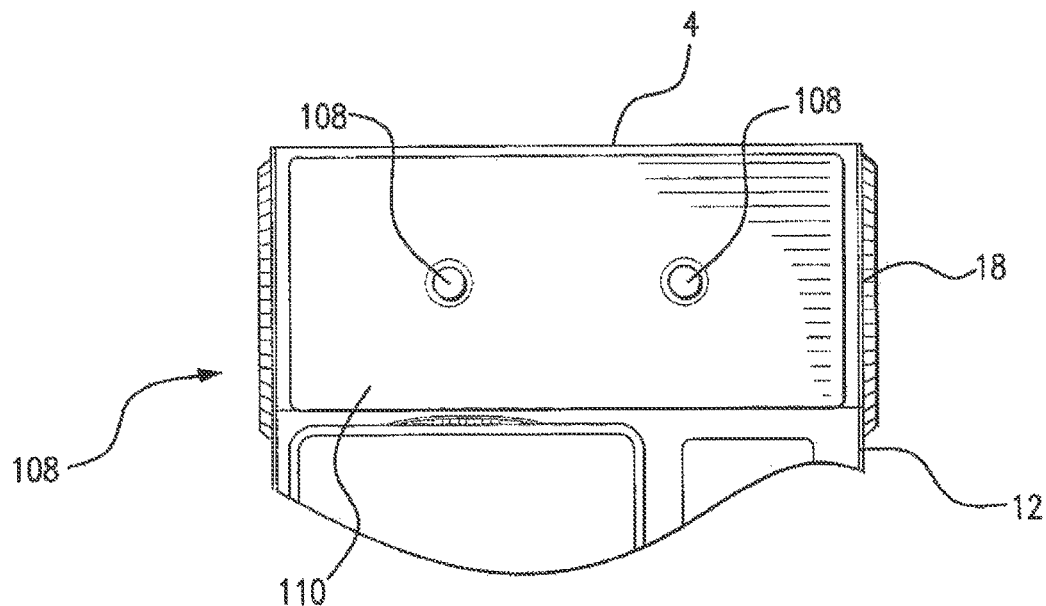
FIG. 6 shows the counter weight system from the top.

FIG. 6 shows the counter weight system 150 from the top. This system 150 consists of two stabilizers 108 that extend upwards from the top side 12 of the elongated bed 18 and contain or stabilize the counter weights 110 that are placed over the front end 4 to counter act the force applied by grappling and skidding of large logs.

Figure 7:
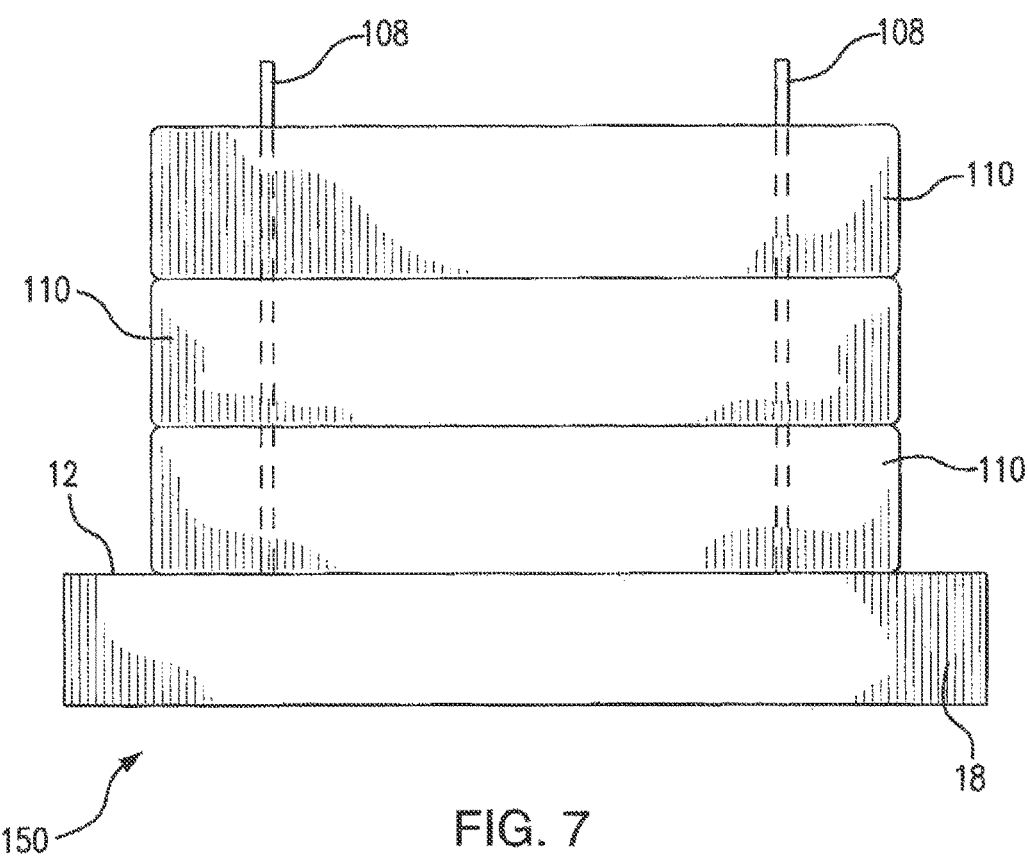
FIG. 7 shows the counter weight system from the side.

FIG. 7 shows the counter weight system 150 from the side. Here again, the counter weight stabilizers 108 support the counter weights 110 on the top side 12 of the elongated bed 118.

What is claimed is:

1. A portable log skidder, said log skidder comprising:
   a. a base frame comprising an elongated bed having an underside and a top, mounted on said underside of said bed, a hydraulic motor assembly consisting essentially of a first hydraulic motor and a second hydraulic motor, each said hydraulic motor having a shaft mounted therein by a first end, a second end of each said shaft having a back wheel mounted thereon;
   b. a hitch attached to elongated bed at its back end;
   c. a front axle, said front axle having two ends and a front wheel mounted on each said end;
   d. an elongated steering shaft for turning the axle and the front wheels
   e. mounted on said top of said bed, a fuel motor, a generator, driven by said fuel motor, a battery, a fuel supply tank for supplying fuel to said fuel motor, a hydraulic oil reservoir, a hydraulic oil pump, there being a shaft from said fuel motor to drive said hydraulic pump, a hydrostatic drive, hydraulic lines for transferring hydraulic oil from and to said hydraulic oil reservoir, said hydraulic pump, and said hydraulic motors;
   f. a stationary first metal stanchion securely affixed by a first end to said top of said elongated bed;
   g. a winch with a winch motor surmounting a second end of said first metal stanchion;
   h. a second metal stanchion securely mounted by a first end on said top of said elongated bed, there being a support bar connecting said first metal stanchion and said second metal stanchion;
   i. said second metal stanchion having mounted near a second end, a pulley, there being a winch rope connected to a grappling hook for logs, said winch rope passing over said pulley and connecting to said winch;
   j. there being an electrical connection between said fuel motor and said generator;
   k. there being an electrical connection between said generator and said battery and between said battery and said winch motor;
   l. the elongated steering shaft for steering said portable log skidder;
   m. a counterweight on said base frame mounted over said front axle.

2. A portable log skidder as claimed in claim 1 wherein said counterweight is comprised of individual, stackable, metal plates.

3. A portable log skidder as claimed in claim 1 wherein said brake system is a hydraulic brake system.

4. A portable log skidder as claimed in claim 1 wherein there is mounted on said elongated steering shaft, a throttle and throttle cable for said fuel motor.

5. A portable log skidder as claimed in claim 1 wherein there is mounted on said elongated steering shaft a hydrostatic electrical switch for said hydrostatic drive from said hydraulic pump.

6. A portable log skidder as claimed in claim 1 wherein there is mounted on said elongated steering shaft a kill switch for said fuel motor.

7. A portable log skidder as claimed in claim 1 wherein, in addition, there is mounted on said elongated steering shaft a kill switch for all electrical devices.

8. A portable log skidder as claimed in claim 1 wherein there is mounted on said elongated steering shaft a handle grip.

9. A portable log skidder as claimed in claim 1 wherein, in addition, there is mounted on said elongated steering shaft a hand brake.

10. A portable log skidder as claimed in claim 1 wherein said brake system is disc brakes.

* * * * *